(12) United States Patent
Gollner et al.

(10) Patent No.: US 7,892,130 B1
(45) Date of Patent: Feb. 22, 2011

(54) TRANSMISSION CONCEPT FOR DUAL YOKE HYDROSTATIC UNITS

(75) Inventors: Wilhelm Gollner, Neumunster (DE); Eric R. Jacobson, Ankeny, IA (US)

(73) Assignee: Sauer-Dafoss Inc., Ames, IA (US)

( * ) Notice: Subject to any disclaimer, the term of this patent is extended or adjusted under 35 U.S.C. 154(b) by 586 days.

(21) Appl. No.: 11/950,148

(22) Filed: Dec. 4, 2007

(51) Int. Cl.
    *F16H 47/04* (2006.01)
(52) U.S. Cl. .......................................... 475/73; 475/80
(58) Field of Classification Search ................ 475/72, 475/73, 80
    See application file for complete search history.

(56) References Cited

U.S. PATENT DOCUMENTS

| | | | |
|---|---|---|---|
| 3,580,107 A | 5/1971 | Orshansky, Jr. | |
| 5,496,223 A * | 3/1996 | Jarchow ....................... | 475/72 |
| 5,643,121 A * | 7/1997 | Greenwood et al. ........... | 475/72 |
| 5,890,982 A * | 4/1999 | Meyerle ...................... | 475/72 |
| 6,761,658 B1 | 7/2004 | Stettler, Jr. | |
| 6,945,041 B2 | 9/2005 | Fleming et al. | |
| 7,465,245 B2 * | 12/2008 | Ripamonti et al. ............ | 475/83 |
| 7,588,509 B1 * | 9/2009 | Marsha ........................ | 475/73 |
| 2003/0166430 A1 | 9/2003 | Folsom et al. | |
| 2007/0277520 A1 | 12/2007 | Gollner | |

FOREIGN PATENT DOCUMENTS

| | | |
|---|---|---|
| DE | 10128076 A1 | 12/2002 |
| DE | 102006025347.7 | 12/2007 |

* cited by examiner

*Primary Examiner*—Ha D. Ho

(57) ABSTRACT

A power split transmission concept for two or three or four modes is provided with two variable hydrostatic units, an engine mechanically connected to the row 1 sun of a planetary gear set with at least two planetary rows, the second row of the planetary rows being connected to a row 2 sun, whereby both hydrostatic units stay connected with the same planetary element through all modes, one hydrostatic unit being connected to the sun of row 2 and the other hydrostatic unit being connected to a ring gear of planetary row 2.

9 Claims, 13 Drawing Sheets

TRANSMISSION CONCEPT FOR DUAL YOKE HYDROSTATIC UNITS

BACKGROUND OF THE INVENTION

The Invention relates to a power split transmission, which is preferably used in agricultural tractors, wheel loaders, fork lift trucks, self driving agricultural and industrial vehicles etc. These types of transmissions are advantageous when having infinitely variable ratios, so that the vehicle speed can be adjusted independently on the engine speed. This allows great control of the engine power, for example to use maximum engine power for maximum profitability in time or for best fuel economy. Vehicles like tractors need a high efficiency of the trans-mission to get low fuel consumption. This drives the transmission concept to a power split design, which is a combination of a mechanical and a hydrostatic transmission. The concept of the transmission thereby is a key factor to achieve high fuel efficiency and low cost. The proposed concept gives a simple planetary design with high efficiency for dual yoke hydrostatic units, which for example are disclosed in the German Patent Application DE 10 2006 025 347. In these hydrostatic units the cylinder blocks of a pump and a motor of bent axis type are coupled by a common yoke. When the pump is varied from zero to maximum flow rate the motor is forced from maximum to minimum flow rate.

STATE OF THE ART

The U.S. Pat. No. 6,761,658 (Stettler) discloses a four mode transmission concept with 2 variable hydrostatic units. This is a concept, which is suitable for production since it has moderate complexity with regard to a four mode transmission. Disadvantage arise from the two independently variable hydrostatic units, which is required from the transmission concept. The complexity of 2 variable units is seen in U.S. Pat. No. 6,945,041 (Fleming). US 2003 166 430 (Folsom) shows a transmission concept with 2 variable hydrostatic units and only one simple planetary. This requires relatively large hydrostatic units, which are requiring lots of space and are expensive. DE 101 28 076 (Fischer) shows a four mode transmission using one variable and one fixed displacement unit. This is a simple hydrostatic unit. The concept requires four clutches, three brakes and four rows of planetaries, which gives high complexity for manufacturing. DE°19°52°966 (Orshansky) shows a four and five mode power split transmission with a very complex planetary system. The carrier holds six planets, which all have two gears (12 gears in total).

Therefore, a primary object of the present invention is the provision of transmission concept suited for dual yoke hydrostatic units, which is of low complexity for manufacturing.

A further object of the present invention is to provide a simple planetary design with high efficiency for dual yoke hydrostatic units.

A further object of this invention is to provide a cost efficient transmission with at least two forward and one mode in reverse.

A further object of the present invention is to provide a cost efficient transmission with three modes and two reverse.

These and other objects will be apparent from the drawings, the description and the claims which follow.

DETAILED DESCRIPTION OF THE PREFERRED EMBODIMENTS

Figure 1:
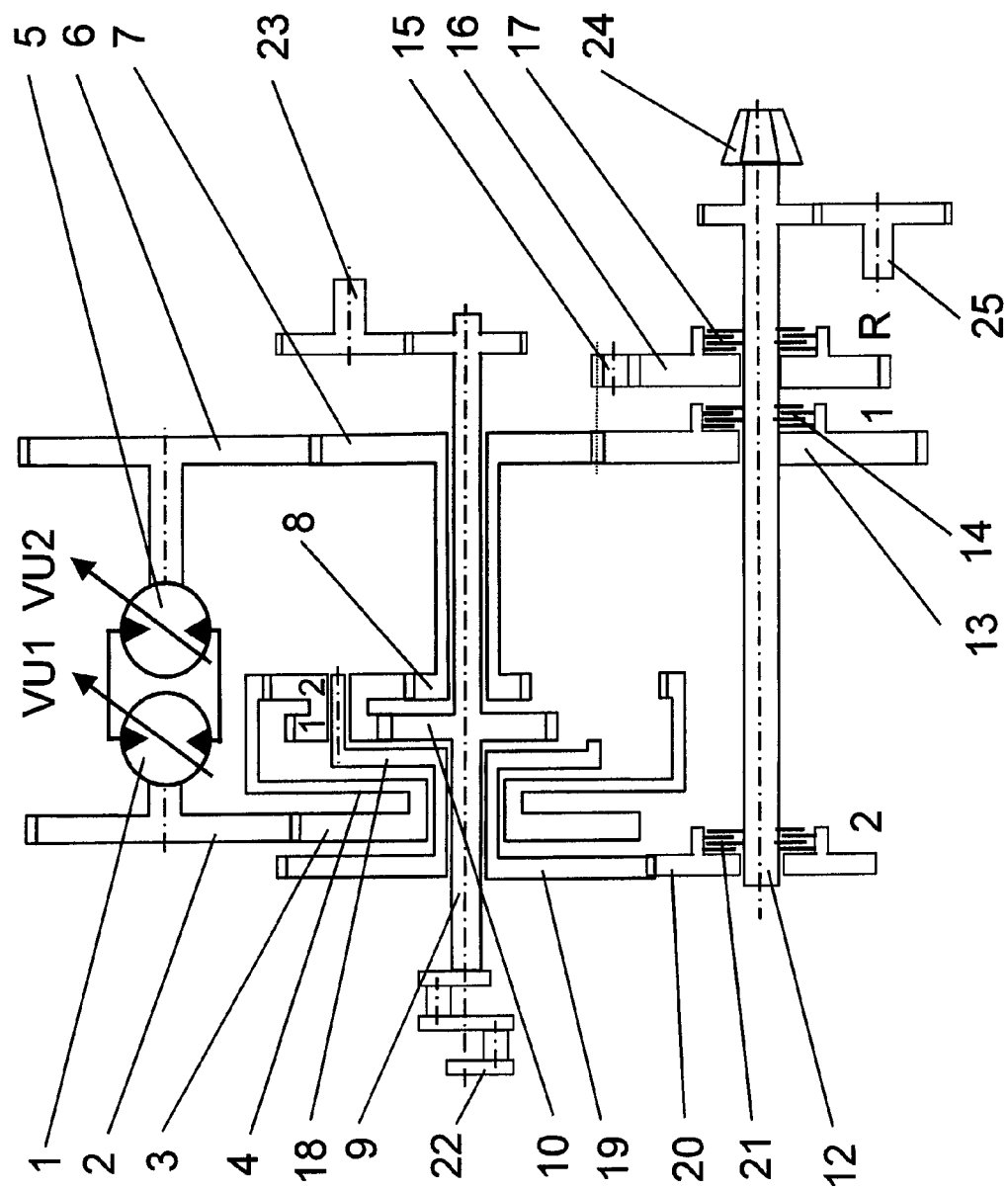
FIG. 1: Transmission Concept with 2 Modes in Forward+1 Mode in Reverse

FIG. 1 shows the transmission concept with two variable hydrostatic units VU1, VU2. The VU1 1 is connected via the gears 2, 3 to the carrier 4 of the planetary row 2, the carrier 4 holding two rows 1, 2. The VU2 5 connects via the gears 6, 7 to the sun 8 of planetary row 2. The engine 22 is driving the sun 10 via shaft 9. This transmission concept has two speed ranges (called modes) in forward and one speed range (mode) in reverse. For mode 1 forward the sun 8 connects via gear 7, gear 13 and clutch 14 to the transmission output shaft 12. The output shaft is driving into the rear axle and to the front axle. For reverse is the sun 8 drives via gear 7, the idler gear 15, gear 16 and clutch 17 to the output shaft 12. The idler 15 reverses the speed for driving reverse. In mode 2 forward, the carrier 18 drives via gear 19, gear 20 and clutch 21 into the output shaft 12. The output shaft connects to the differential 24 of the rear axle and to the shaft 25, which connects to the front axle.

Figure 2:
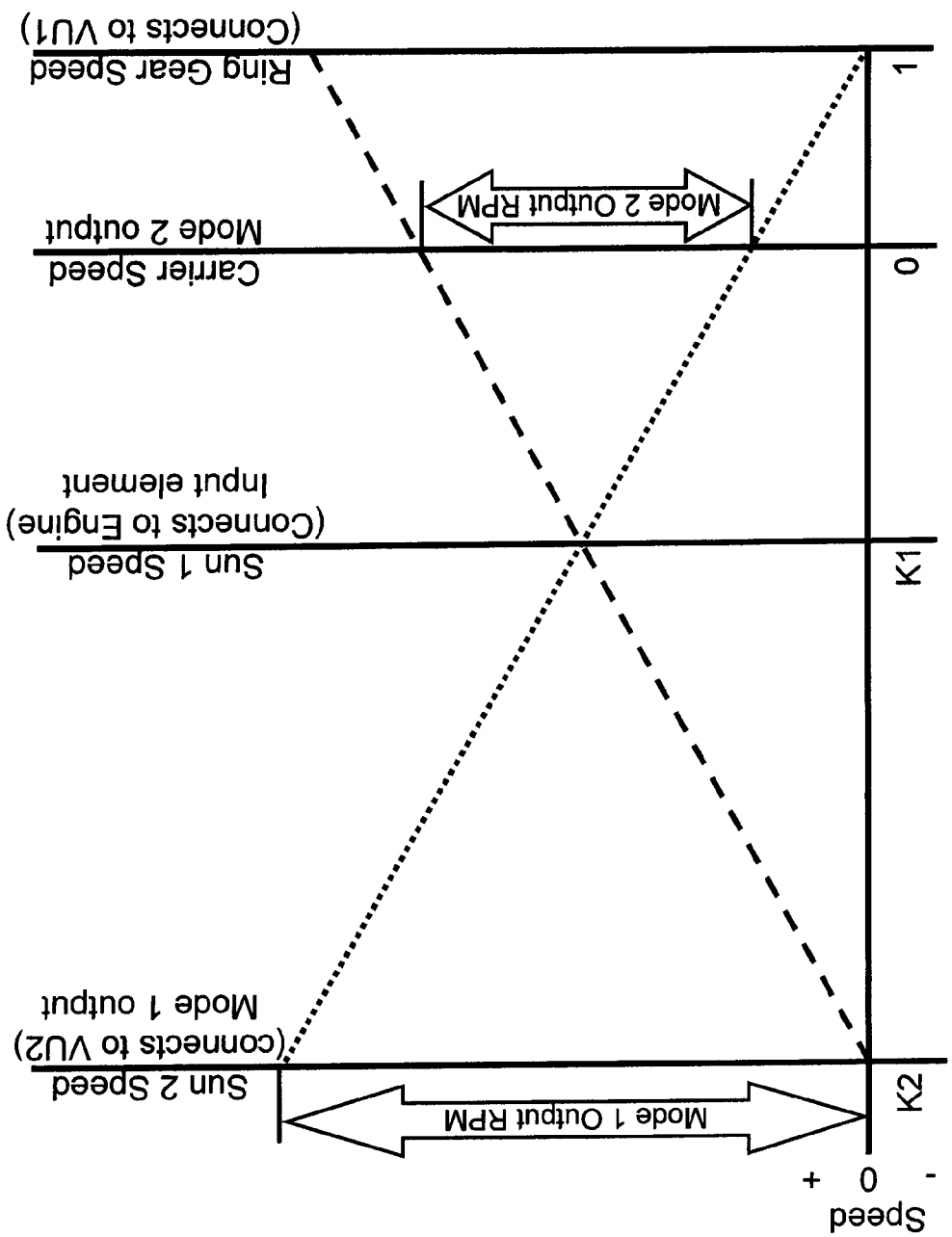
FIG. 2: Speed Diagram for Planetary Elements in the 2 Mode Concept

FIG. 2 shows the speeds of the planetary elements. It is very advantageous to connect the engine to the sun of the row 1 planetary. This helps sizing the planetary gears in a way, so that the second sun (sun 2 in FIG. 2) is not getting to extremely high speeds. The ratio K2 is designed to have an output speed at second sun between 0 and a max. value. This allows to connect the first mode to the second sun. The planetary ratio K1 and the gear ratios of the gears 19, 20 and gears 7, 13 are calculated to have the same output shaft 12 speed at the max mode 1 speed and the min mode 2 speed. This gives a mode 1 to 2 change with no change in vehicle speed.

At vehicle start the VU2 is connected to the output shaft, which then is not turning. VU1 connects to the ring gear, which is at max. speed (dashed line). The vehicle accelerates with VU1 increasing the angle from 0 to max. At the same time VU2 increases in speed and VU1 decreases in speed. At the max speed of mode 1, VU1 is with min speed at max displacement and VU2 in max speed at min displacement. The dotted line shows this operating point. After the shift into mode 2 further acceleration is by increasing the displacement of VU2 (while decreasing speed) and by decreasing displacement of VU1 (while increasing speed).

This planetary concept is very good in efficiency since it does not have counter rotating speeds. All elements speeds are positive and have the same direction as the engine.

The other positive aspect is, that the speeds of VU1 and VU2 are always positive and the displacements follow the opposite sequence of mode 1. This allows the use of the dual yoke concept shown in DE 10 2006 025 347. This is a big advantage in cost and reliability as described in the patent.

Figure 3:
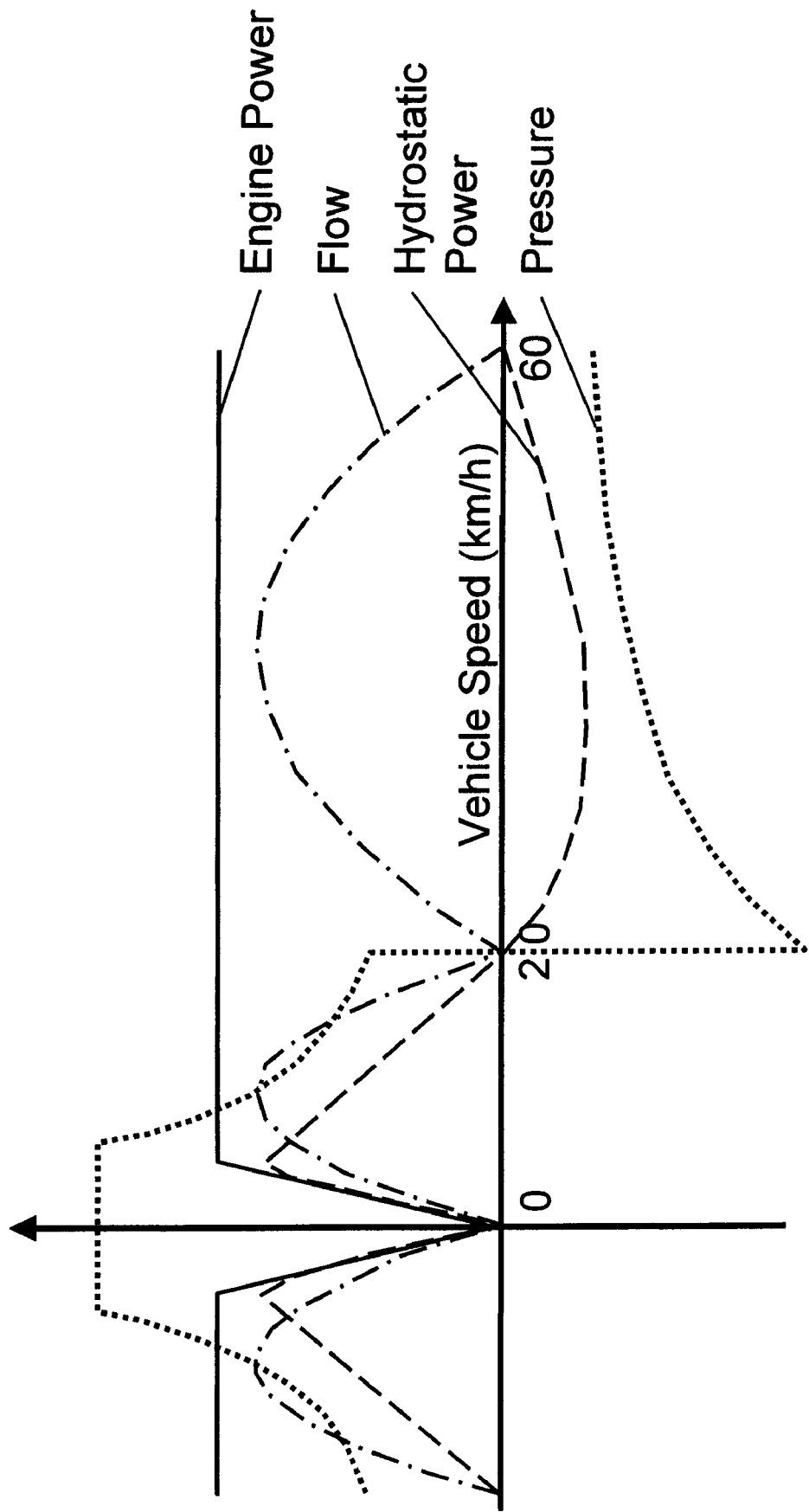
FIG. 3: Pressure, Power & Flow for the 2 Mode concept

FIG. 3 shows the operating conditions of the hydrostatic module. At the x-axis is vehicle speed, on the y-axis is engine power and the pressure, flow and power of the hydrostatic module (VU1 and VU2). At very low vehicle speeds, the power is mostly transferred hydrostatic. At about ¼ of mode 1 speed the hydro power is maximum (~80% of engine power) and it reduces to 0 at the end of mode 1. In mode 2 the hydro power only gets to about 30% of the engine power. The low power at the hydrostatic module gives high efficiency for the transmission. The best points of transmission efficiency are in the high end of mode 1 and 2 due to low hydrostatic power level and low pressure. In the very low vehicle speed the power in the transmission is limited by the pressure setting of the hydrostatic module. Assuming a ratio of 3 for the second mode, then the mode 1 to 2 shift is at 20 km/h for a vehicle having 60 km/h as max. speed. A ratio of 2 to 4 is practical, depending on the vehicle needs.

Figure 4:
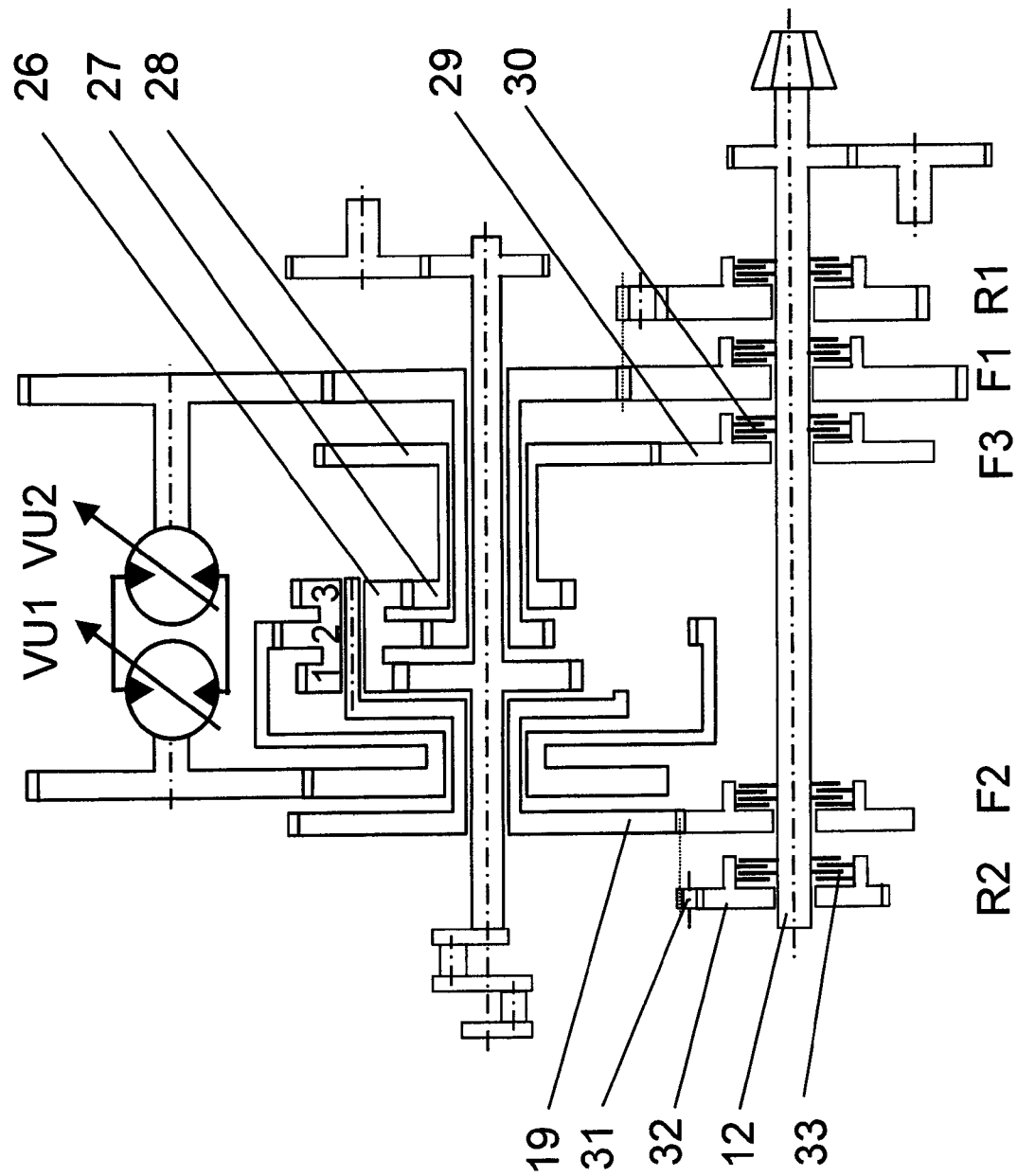
FIG. 4: Transmission Concept with 3 Modes Forward+2 Reverse (w/idler gear)

FIG. 4 shows an extension of the transmission concept shown in FIG. 1. A third row of planetary 26 is added. This gives a third sun 27, which drives the output shaft 12 via gears 28 and 29 and clutch 30. Since a three mode transmission gives about 15-20% speed of the max vehicle speed, the 1 mode reverse is typically not enough. So a three mode transmission requires more than 1 mode for reverse. FIG. 4 shows a second mode for reverse by adding the idler gear 31, gear 32 and the clutch 33.

Figure 5:
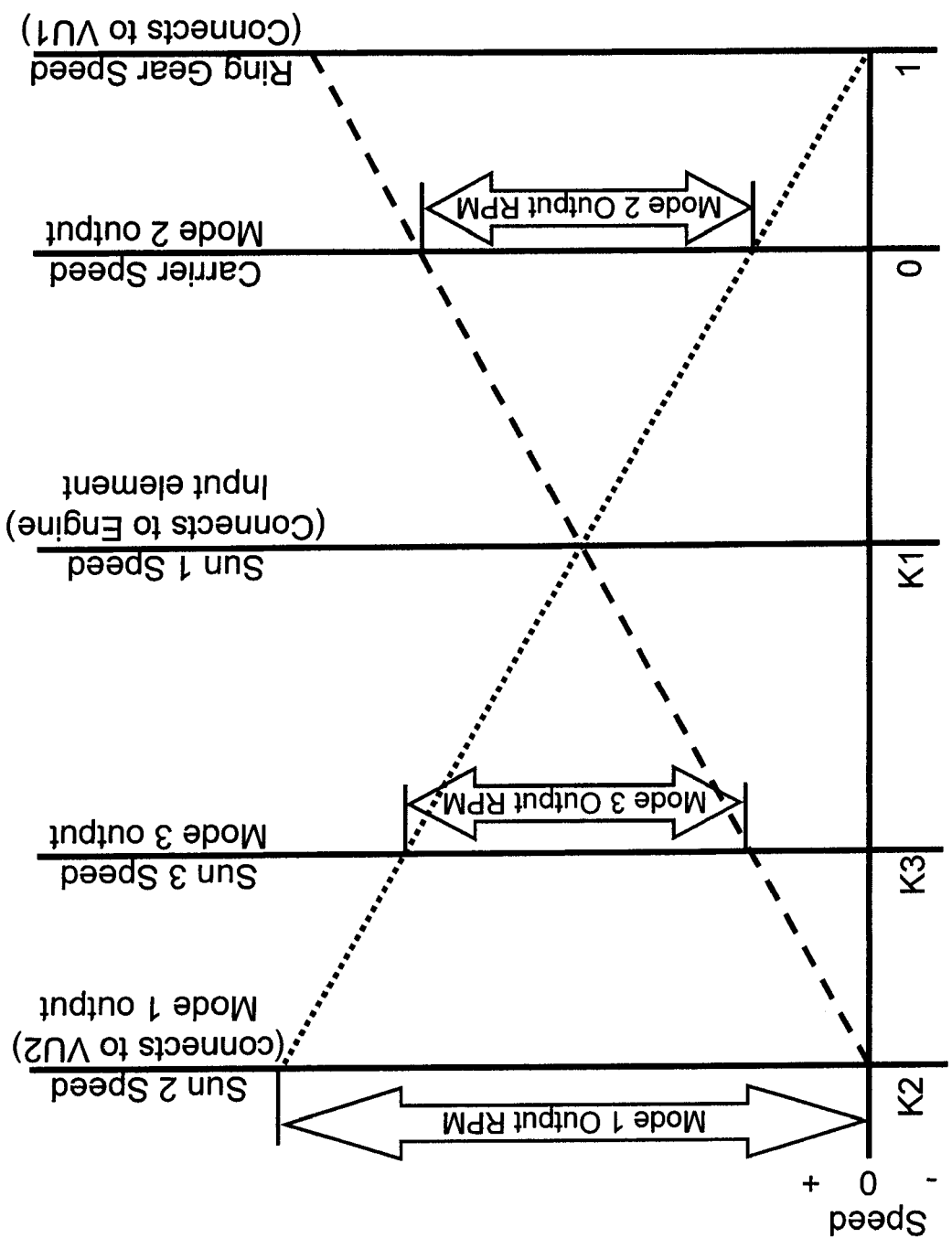
FIG. 5: Speed Diagram for Planetary Elements in the 3 Mode Concept

FIG. 5 shows the planetary speeds with the added 3rd mode. Via proper sizing of the sun 3, a full 3rd mode is added over the 2 mode speeds of FIG. 2.

Figure 6:
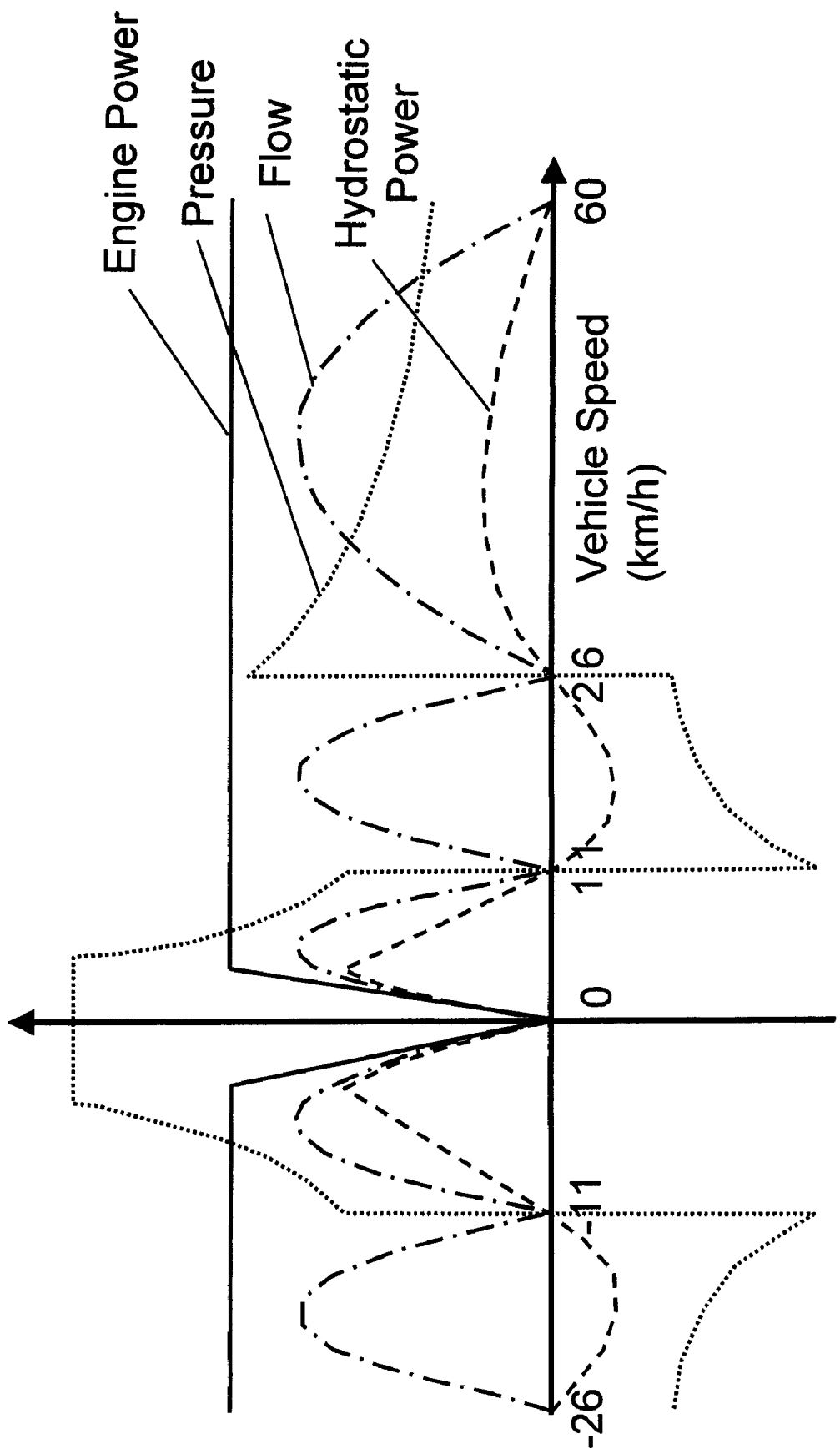
FIG. 6: Pressure, Power, Flow for the 3 Modes Concept

FIG. 6 shows the operating conditions of the hydrostatic module in a 3 mode concept. The hydrostatic power is positive in mode 1 (parallel to the mechanical power), negative in mode 2 (power flows backwards) and positive again in mode 3. The mode 3 in addition allows to reduce the size of the hydrostatic modules VU1 and VU2, so that less power is transferred via hydrostatics. This gives improved efficiency for the total transmission. The best points for efficiency are at the end of each mode (11 km/h, 26 km/h and 60 km/h).

Without reducing the size of the hydrostatic module, the additional 3rd mode allows to use the components of the 2 mode in a higher horsepower transmission. This gives a modular design and improved usage of the same parts.

Figure 7:
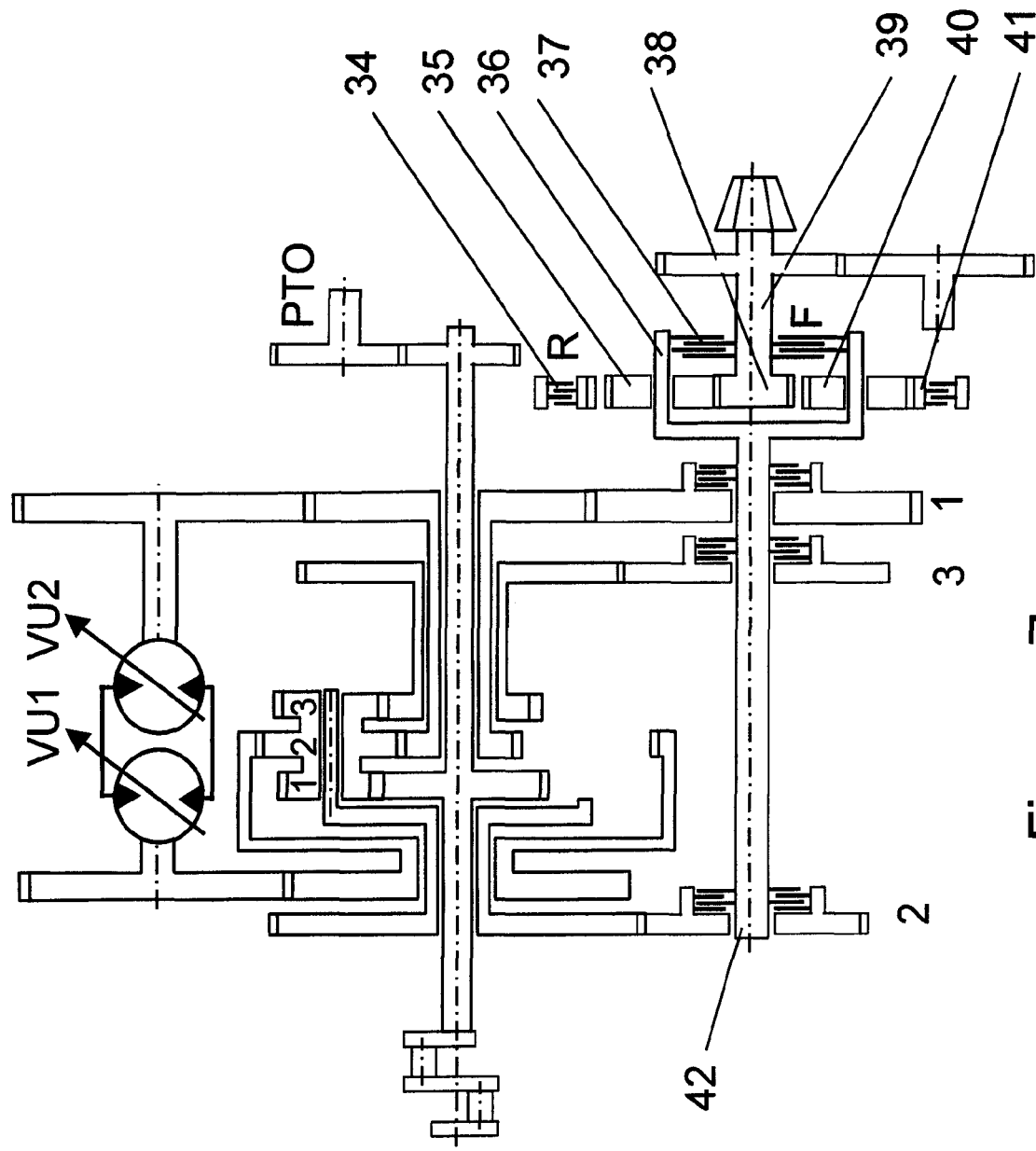
FIG. 7: 3 Modes Forward w/Reversing Planetary at Transmission Output Shaft

FIG. 7 shows a 3 mode with full reverse speed. The shaft 42 drives the carrier 36. In forward the carrier is connected via the clutch 37 to the output shaft 39. In reverse the carrier 36 drives the planet 35, which connects to planet 40. The carrier also drives planet 40, which connects to the ring gear 41, which is locked by the brake 34. In this way the reverse speed can be as fast as the forward speed. This is typically used in wheel loaders.

Figure 8:
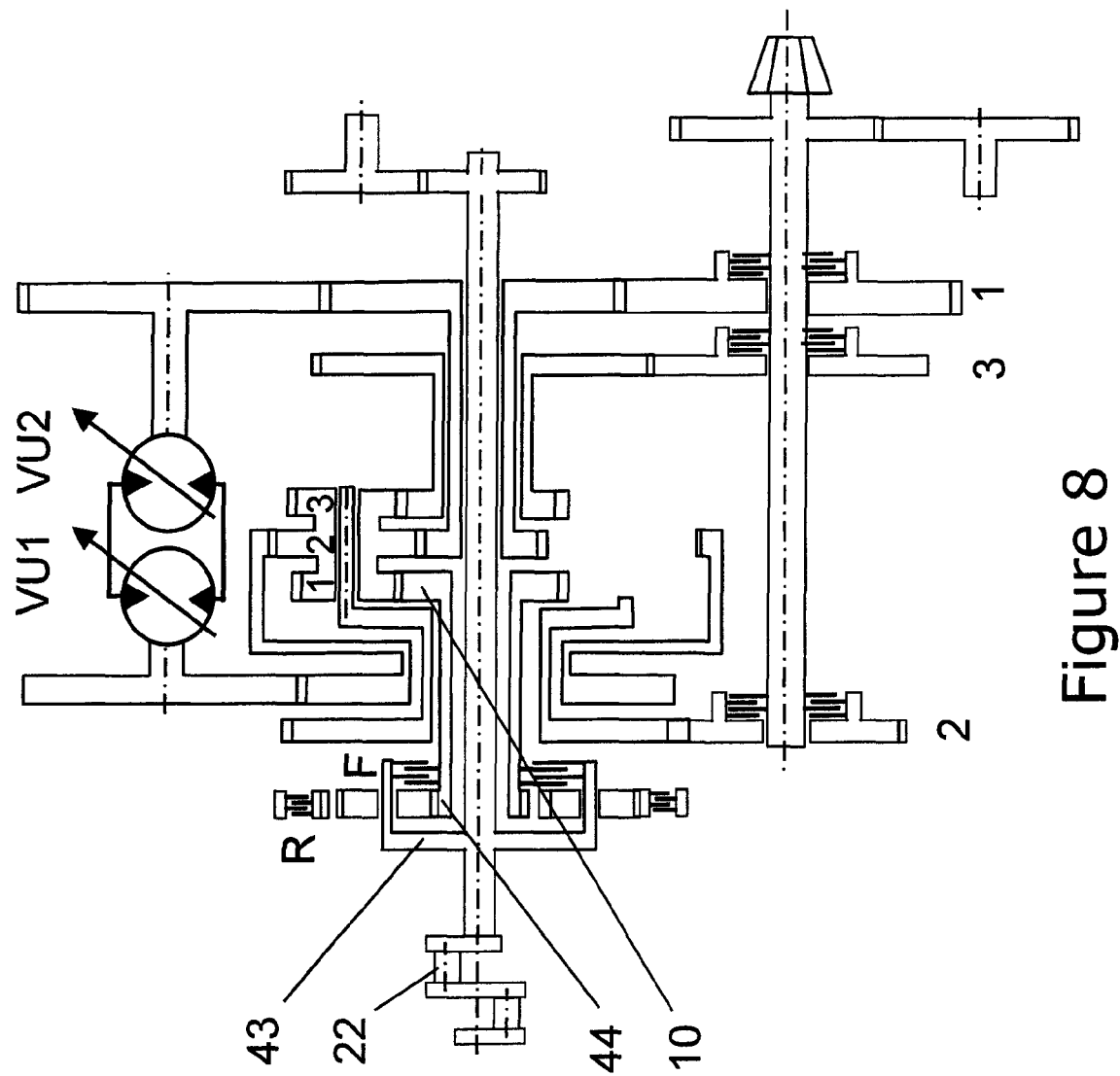
FIG. 8: 3 Modes Forward w/Reversing Planetary at Transmission Input Shaft

FIG. 8 shows an alternative reverse to FIG. 7. The reversing planetary is at the transmission input shaft. The engine 22 drives the carrier 43. The output is the sun 44, which drives sun 10 of the planetary row 1. The function of the planetary is the same as described in FIG. 7. This position of the reversing planetary is advantageous since this shaft has less torque and less speed. Losses are less and parts are smaller in size.

Figure 9:
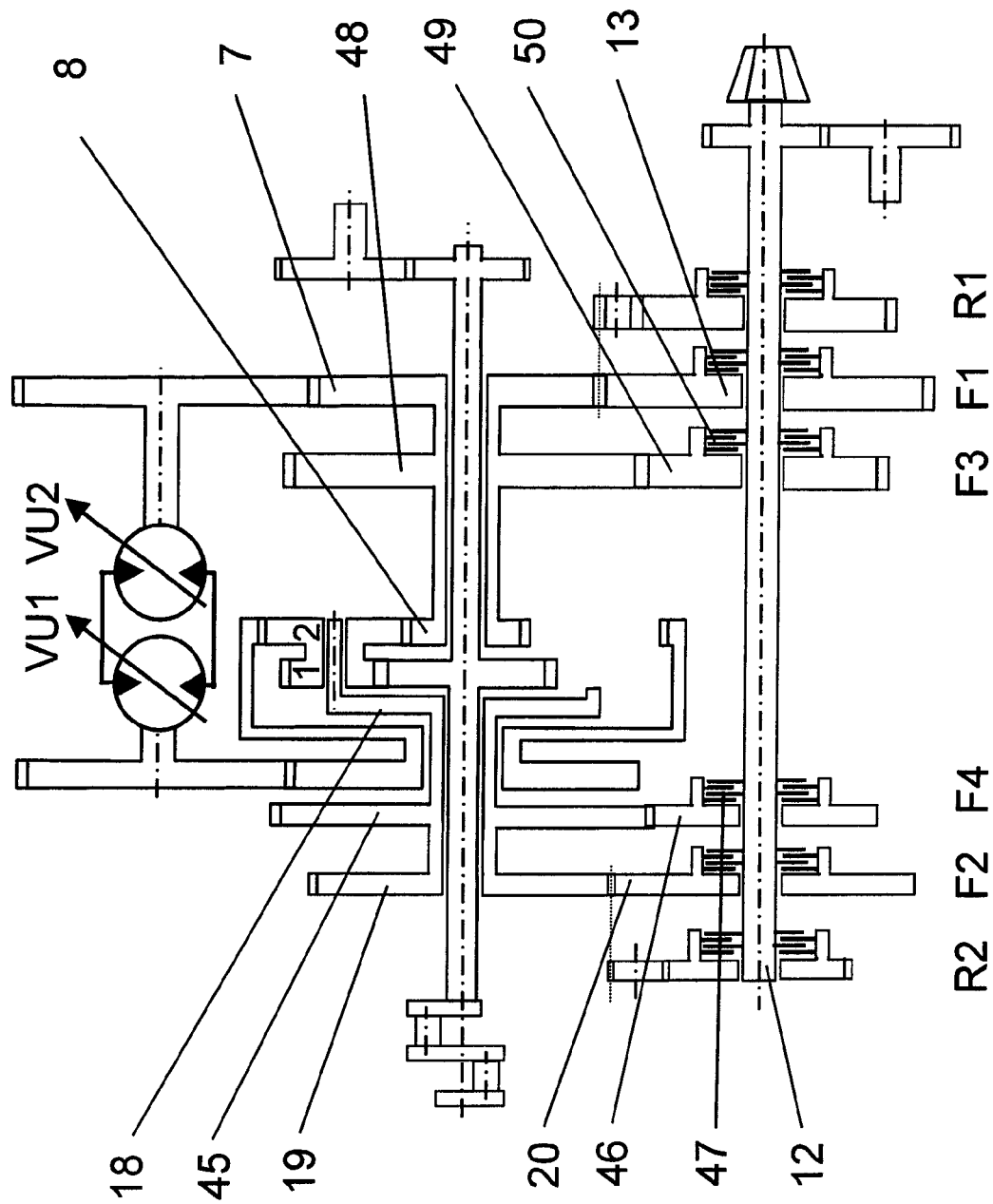
FIG. 9: Transmission Concept with 4 Modes in Forward+2 Modes in Reverse

FIG. 9 shows a possibility for 4 modes out of the basic planetary for a 2 mode system from FIG. 1. The sun 8 drives another set of gears 48, 49 to the output shaft 12, which gives a mode 3. The carrier 18 drives a forth mode through the gear set 45, 46.

Figure 10:
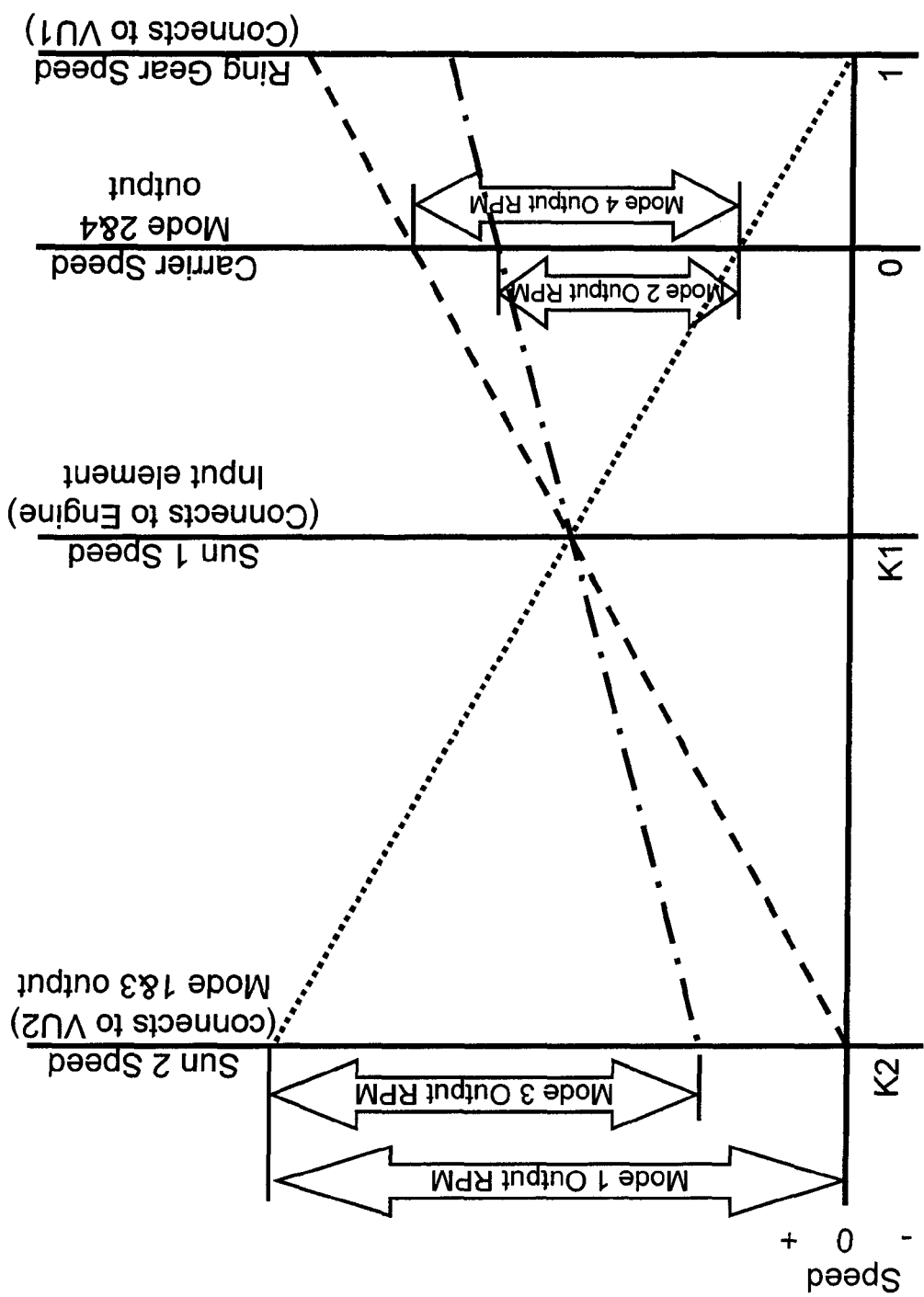
FIG. 10: Speed Diagram for Planetary Elements in the 4 Mode Concept Using the 2 Mode Planetary Concept (2 full modes+2 half modes)

FIG. 10 shows the speeds of the concept of FIG. 9. The modes 2 and 3 are modes with reduced ratios. They do not utilize the full capability since Mode 3 has to start with the dotted/dashed line. Otherwise the mode 3 output speed would be zero or very small, which gives very high pressure levels in the hydrostatic module.

Figure 11:
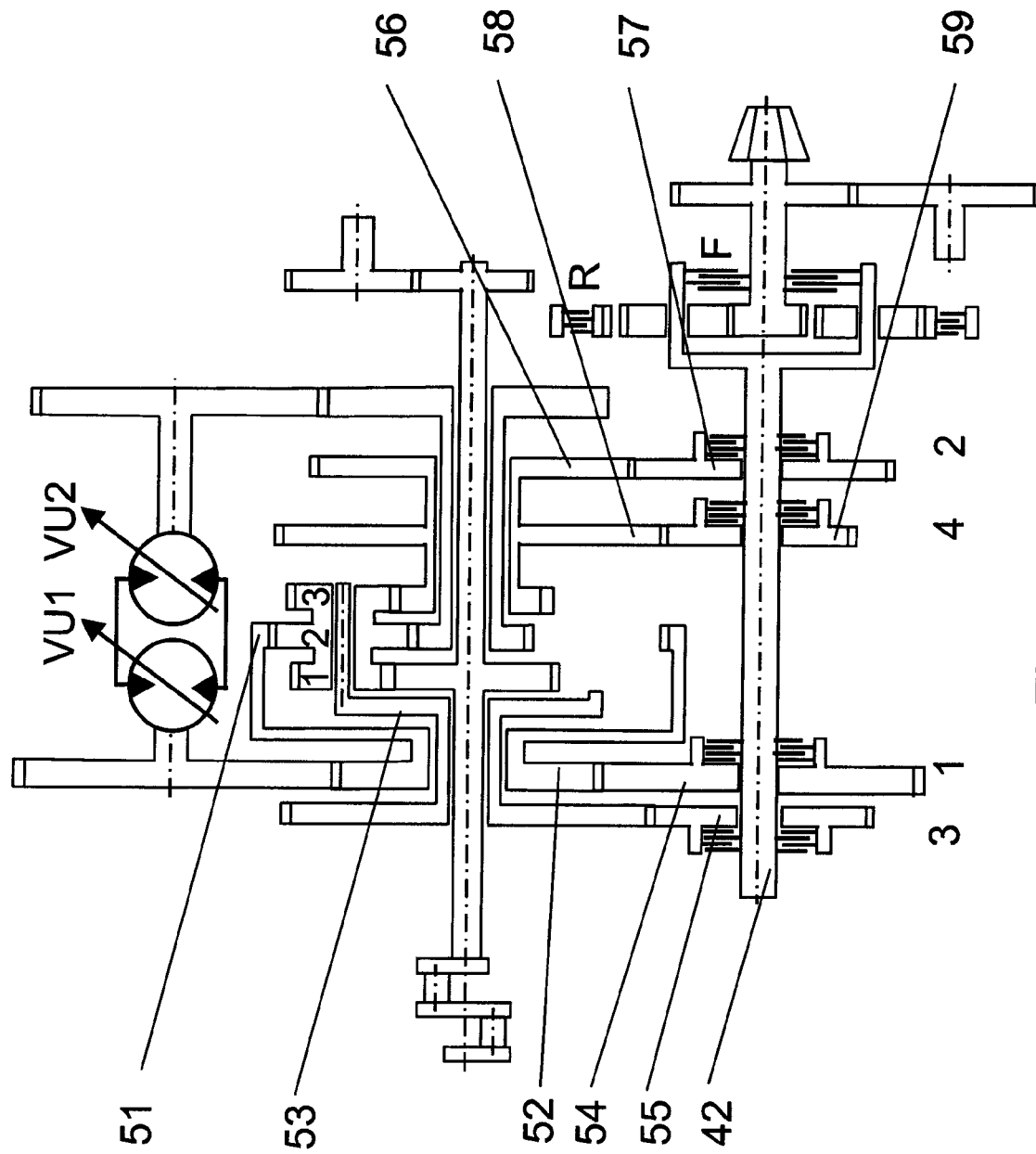
FIG. 11: 4 Modes Forward w/Reversing Planetary at Transmission Output Shaft using the Ring Gear as Mode 1 Output

FIG. 11 shows an alternate solution for a 3 or 4 mode concept. Here the mode 1 comes from the ring gear 51 through gear 52 to the shaft 42. In consequence the mode 2 is from the sun 3 through gears 56 and 57. Mode 3 is from the carrier 53. The planetary can be designed so that the carrier has less output speed compared to the sun of planetary row 2. This reduces the gear ratio for the gears 52 and 54. The potential mode 4 is as mode 2 from the sun 3, but has separate gear ratios 58 and 59.

Figure 12:
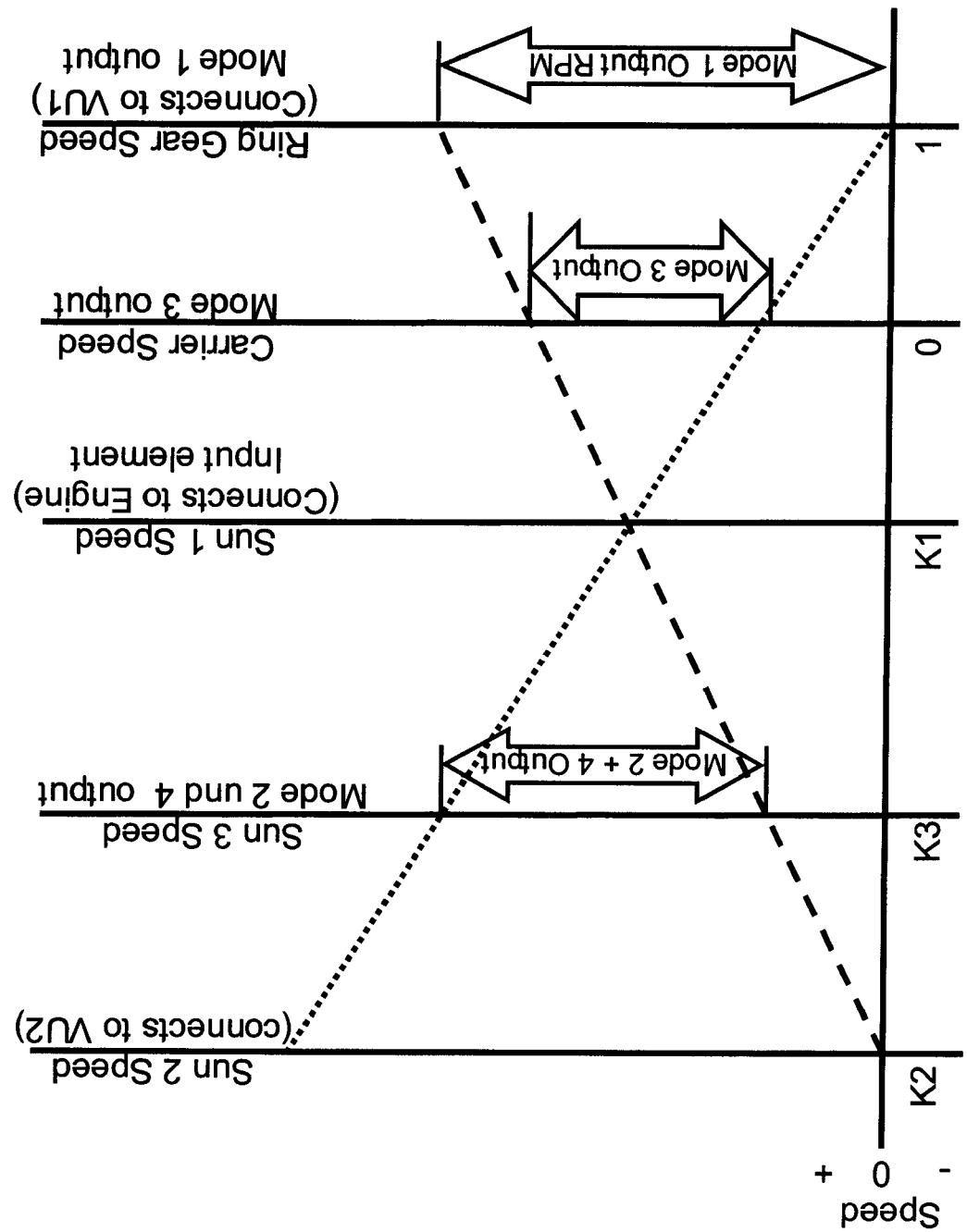
FIG. 12: Speed Diagram for Planetary Elements in the 4 Mode Concept using the Ring Gear as Mode 1 Output

FIG. 12 shows the element speeds of the transmission concept of FIG. 11. Key is to reduce the planetary output speed for mode 1 since the output shaft is very slow in mode 1. This can be done by decreasing K1 ratio and increasing K2. The high sun 2 output speed matches nice with the high speed of VU2.

Figure 13:
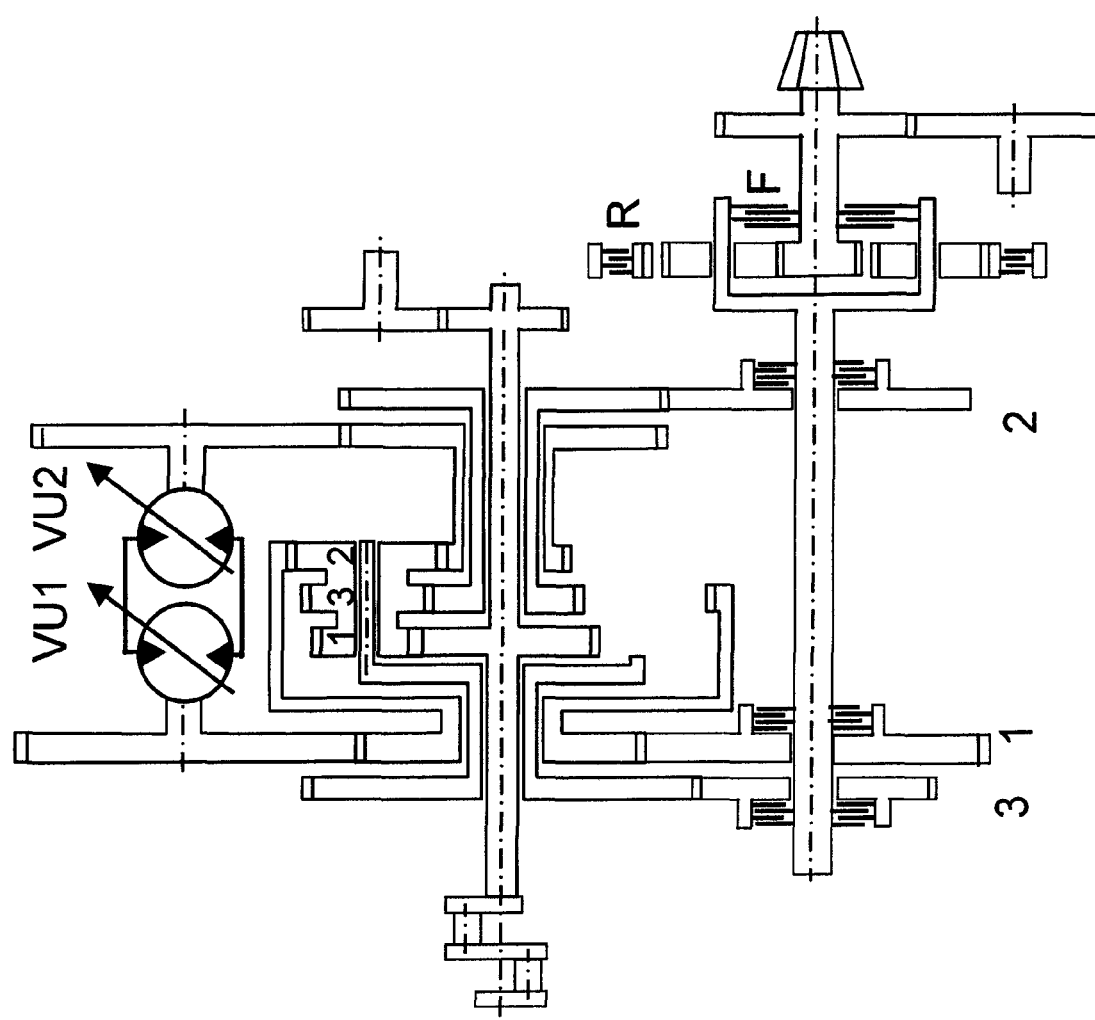
FIG. 13: As FIG. 11, but the Planetary optimized for Manufacturing

FIG. 13 shows a modified planet design, which is easier to machine. The original planetary row 3 is changed with row 2. This improves the spline machining.

What is claimed is:

1. A power split transmission concept for two or three or four modes, the concept comprising:
    two variable hydrostatic units;
    an engine mechanically connected to a row 1 sun of a planetary gear set with at least two planetary rows
    planets of row 1, 2 and 3 mechanically connected or as one piece,
    whereby both hydrostatic units stay connected with the same planetary element through all modes,
    one hydrostatic unit being connected to a sun of row 2
    the other hydrostatic unit being connected to a ring gear of planetary row 2.

2. A power split transmission according to claim 1, where a mode 1 output is from the sun of row 2 of the planetary and a mode 2 output is from a carrier of the planetary.

3. A power split transmission according to claim 2, where a mode 3 output is from a row 3 sun.

4. A power split transmission according claim 1, where a planetary reverser is used at a transmission output shaft for full reverse speed.

5. A power split transmission according claim 1, whereby a planetary reverser is used at a transmission input shaft for full reverse speed.

6. A power split transmission concept for two or three or four modes, the concept comprising:
    two variable hydrostatic units;
    an engine mechanically connected to a row 1 sun of a planetary gear set with three planetary rows;
    planets of row 1, 2 and 3 mechanically connected or as one piece,
    whereby both hydrostatic units stay connected with the same planetary element through all modes,
    one hydrostatic unit being connected to a sun of row 2,
    the other hydrostatic unit being connected to a ring gear of planetary row 2,
    whereby a mode 1 output is from a ring gear of the planetary, a mode output 2 and a mode 4 output is from a row 3 sun and a mode 3 output is from a carrier of the planetary.

7. A power split transmission according claim 6, whereby a mode 1 planetary output is used for reverse via idler gear.

8. A power split transmission according claim 6, whereby a mode 2 planetary output is used for reverse via idler gear.

9. A power split transmission according claim 6, whereby a planetary reverser is used at a transmission input shaft for full reverse speed.

* * * * *